No. 816,330. PATENTED MAR. 27, 1906.
T. J. JOHNSTON.
FRICTIONLESS BEARING FOR ELECTRIC METERS.
APPLICATION FILED SEPT. 28, 1901.
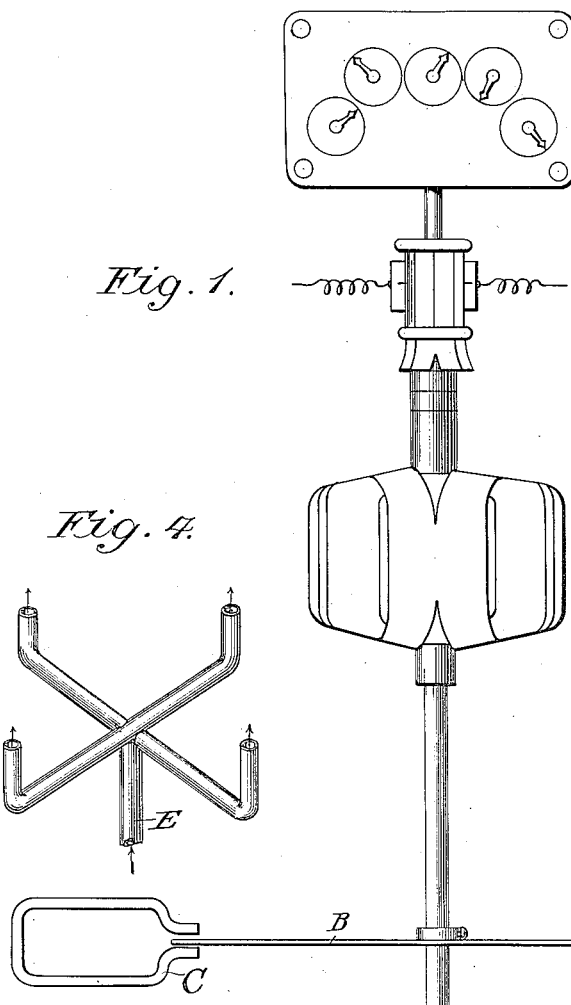
Fig. 1.
Fig. 4.
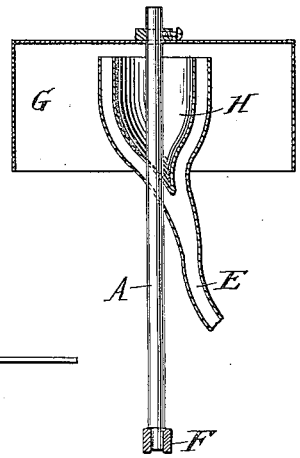
Fig. 2.
Fig. 3.
Witnesses
Edward C. Rowland.
Albert G. Davis.
Inventor
Thomas J. Johnston

UNITED STATES PATENT OFFICE.

THOMAS J. JOHNSTON, OF BROOKLYN, NEW YORK, ASSIGNOR TO GENERAL ELECTRIC COMPANY, A CORPORATION OF NEW YORK.

FRICTIONLESS BEARING FOR ELECTRIC METERS.

No. 816,330.

Specification of Letters Patent.

Patented March 27, 1906.

Application filed September 28, 1901. Serial No. 76,967.

*To all whom it may concern:*

Be it known that I, THOMAS J. JOHNSTON, of Brooklyn, in the county of Kings and State of New York, have made certain new and useful Improvements in Frictionless Bearings for Electric Meters, of which the following is a specification.

My present invention relates to frictionless bearings for electric meters, and has for its object to so support the shaft of the rotating element of a power-actuated meter as to substantially relieve it of friction, allowing the rotating element to respond to changes in torque as promptly as possible, and thus follow with more exact proportion variations in current or electromotive force, so that the meter reading may be proportional to the power in the circuit.

The improvement is applicable to any form of meter, but is especially useful with electric-motor meters; and it consists in supporting the rotating element pneumatically, so as to make it free from substantial mechanical friction, such as is present being due not to the pressure by gravity of the rotating parts, but to mere superficial contact of the journals with the bearing-surface, which may be as free as is compatible with a good mechanical construction. The preferred means for obtaining the pneumatic support is by compressed air.

One way of carrying out the invention is to supply a blast of air to the journal of such pressure as to support the moving parts, the journal itself being left somewhat loose and being symmetrically shaped, so that the rotating element revolves practically free from contact with the journal-bearing. I may, however, adopt a different disposition of the elements of the device without departing from the invention. For example, I may employ one or a number of jets of fluid-pressure disposed against the under surface of the brake disk or drum of the meter. Other dispositions might be made without affecting the invention, the essential feature of which is the support of the rotating element by fluid-pressure. By thus practically eliminating friction the meter may be adjusted to register with almost absolute proportionality either very small or very large loads, or both, without impairing its accuracy for average demands.

The accompanying drawings show embodiments of the invention.

Figure 1 is a side elevation, partly in section, of the arrangement in which compressed air is applied directly to the journal-bearing of the rotating element. Fig. 2 is a similar view of an arrangement in which the compressed air supports the rotating element by pressure beneath the meter-drum. Fig. 3 is a plan of part of the device shown in Fig. 2. Fig. 4 is a modification.

In Fig. 1, A is the shaft of the meter, of which B is the brake-disk, C being one of the magnets. The shaft A is tapered at A', and a short cylindrical extension $A^2$ is provided, if desired. The bearing D is conical, and the pipe E leads to this from a source of compressed air. (Not shown.) The pressure should be such as to support the parts of the rotating element without producing pressure against the upper bearing, which is not shown. The other parts of the meter being like those in common use, I have deemed it unnecessary to illustrate them, inasmuch as they have no special relation to my invention and may be varied in any customary manner without affecting this application. The bearing D is tapered at D' on its inner face, and this tapering, in conjunction with the substantially similar arrangement of the shaft A, tends to produce the pneumatic flotation to which I have referred, inasmuch as when the shaft rises above its point of equilibrium the pressure is released to a greater extent and the force acting against the shaft necessarily diminishes, permitting the shaft to lower to its proper position of rotation.

In Fig. 2 the lower bearing F is shown as cylindrical. I have illustrated a drum G as the braking element of the meter, this being one of the well-known devices for the purpose. A ring-nozzle H is supplied by the pipe E in that case and tends to produce a symmetric pressure upon the under surface of the drum. The plan of the nozzle is shown in Fig. 3; but any other suitable disposition of the parts may be employed, and it is manifest that the device of Figs. 2 and 3 may be used with the form of meter-rotor shown in Fig. 1 without modification.

In Fig. 4 I show a number of jets symmetrically disposed about an axis which should coincide with the shaft, so that the drum may be symmetrically floated.

It is manifest that the forms of the device shown in Figs. 2 and 4 do not require so high a pressure to accomplish their object as that shown in Fig. 1; but in general they employ the same principles for their operation.

Having thus described my invention, what I claim, and desire to protect by Letters Patent of the United States, is—

1. In a meter, a movable element, a vertical shaft therefor the end of which is tapered, and means for applying air under pressure to said tapered end to support the shaft free from said means.

2. The combination of a rotatable shaft having a tapered end, means for applying air under pressure to said tapered end to support the shaft free from said means, and a bearing to position the shaft.

3. In a meter, a movable element, a vertical shaft therefor having a surface arranged at an angle to the axis of rotation of the shaft, and means for applying air under pressure to said surface to support the movable element with a clearance between said surface and said means of sufficient width to permit the air to pass freely therethrough.

4. The combination of a vertical rotatable shaft having thereon a surface arranged at an angle to the axis of the shaft, means for applying air under pressure to said surface to support the shaft with a clearance between said surface and said means of sufficient width to permit the air to pass freely therethrough, and a bearing to position the shaft.

In witness whereof I have hereunto set my hand in the presence of two witnesses.

THOMAS J. JOHNSTON.

Witnesses:
ERMINA E. WALKER,
DANIEL J. McNAMARA.